ated.

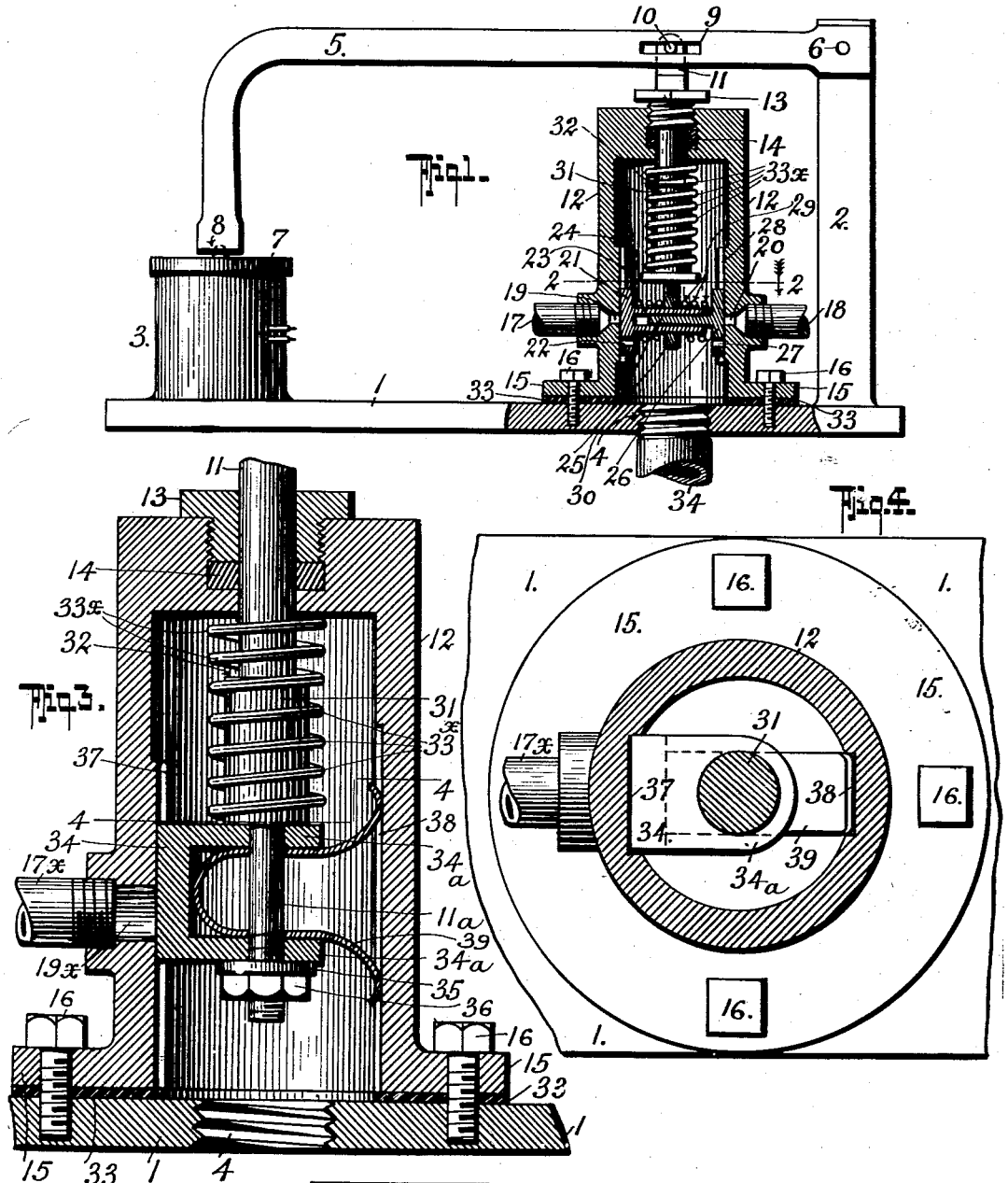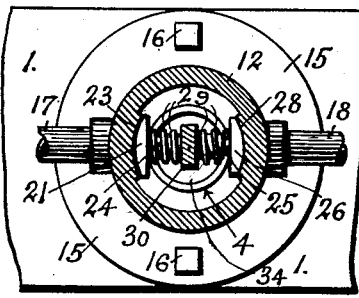

UNITED STATES PATENT OFFICE.

JEAN F. WEBB, JR., OF NEW YORK, N. Y., ASSIGNOR TO THE ELECTRIC SIGNAGRAPH AND SEMAPHORE CO., OF NEW YORK, N. Y., INCORPORATED.

AIR-OPERATED ELECTRICALLY-CONTROLLED VALVE MECHANISM.

948,405.     Specification of Letters Patent.     Patented Feb. 8, 1910.

Original application filed April 7, 1909, Serial No. 488,390. Divided and this application filed August 18, 1909. Serial No. 513,414.

*To all whom it may concern:*

Be it known that I, JEAN F. WEBB, Jr., residing at New York, in the county of New York and State of New York, have invented a new and Improved Air-Operated Electrically-Controlled Valve Mechanism, of which the following is a specification.

My present invention presents two forms of air operated electrically controlled valve mechanisms, the first or primary form herein disclosed, being a divided part of my application filed April 7, 1909, Ser. No. 488390, while the second form herein disclosed is a modification of the first form.

In my application above referred to I have claimed the broad combination of an air operated valve mechanism with an electrically controlled actuating lever, and I have also claimed such lever in combination with a certain specific form of valve mechanism. Therefore, in this application I make no claim to the broad combination between the magnetically controlled lever and the valve mechanism, generally, but shall confine myself in this application to claims covering the construction of the two forms of valve mechanisms *per se*, herein shown and described, and certain specific valve mechanisms in combination with an electromagnetic controlling lever device of any general type.

The invention of the present application therefore resides in the provision of the valve housing or dome, in which a slide valve operates to control an outlet and air exhaust port, and electromagnetically controlled lever devices to which the valve stem connects.

Those novel details of construction, combination and arrangement of parts, hereinafter described and specifically pointed out in the appended claims, also form a part of the present invention.

In the drawings: Figure 1, is a side elevation and part central vertical section of that form of my invention which was divided out of my application aforesaid. Fig. 2, is a horizontal section on the line 2—2 of Fig. 1. Fig. 3, is an enlarged central, vertical, longitudinal section of a modified form. Fig. 4, is a horizontal section on the line 4—4 of Fig. 3.

In the drawings, in which like numerals and letters of reference indicate like parts in all of the figures, 1 represents the base which has a standard 2 and which supports an iron clad electromagnet 3. The base 1 has a tapped hole 4 to receive the connection 34 from the train pipe of an air brake system. A lever 5 is pivoted at 6 to the standard 2 and carries an armature 7 which may be integral with the lever or swivelly connected thereto as at 8 since the specific construction of the lever and armature *per se* form no part of the present invention. The lever 5 has a slot 9 through which a pin 10 passes, the pin 10 also passing through the end of the valve stem 11. A dome like casing 12 is fitted over the hole 4 of the plate 1 and the stem 11 projects into the same, a packing 14 and a gland nut 13 being used to effect an air tight passage for the stem 11. The valve casing 12 has a flange 15 through which screw bolts 16 pass to secure the casing to the base 1, a washer 33 being interposed to effect a tight joint. The casing 12 has an outlet port 19 from which pipe 17 carries air to a whistle or other signal (not shown) if desired, while a second port 20 is provided from which a pipe 18 conveys air to atmosphere or to any other desired place. The ports 19 and 20 are simultaneously controlled by a slide valve composed of a section 21 having a port 22 to coöperate with the port 19. The slide 21 operates in a slide-way 23 and has a tubular projection 24 to receive the projection 25 of a second slide 26 whose aperture 27 coöperates with the port 20. This slide 26 operates in a second slide-way 28. The slides 21 and 26 are held to their seats by springs 29 and are moved by the stem 11, one end 30 of which receives the tubular projection 24. The stem 11 has an enlargement 31 to form a shoulder 32 to limit the stem's movement in one direction. A coil spring $33^\times$ may be employed when desired to assist in keeping the valve mechanism closed.

The modified form shown in Fig. 3 differs from that shown in Fig. 1 in having a different type of slide valve 34 to control the port $19^\times$, from which the pipe $17^\times$ may be used to convey the air to any desired place. In this form also the slide 34 has apertured ears $34^a$ to receive the end $11^a$ of the valve stem 11, the slide being held in place by a washer 35 and nut 36, as clearly shown in the drawing. The slideways 37 and 38 are of flat form as indicated in Figs. 3 and 4 while those shown in Figs. 1 and 2 are of cylindrical cross section. A leaf spring 39 holds the slide 34 to its seat.

Operation: In operation, it should be understood that the pipe 34 connects to the train pipe of an air brake system of a train so that when the magnet 3 is energized by being connected in a closed controlling circuit of any approved type, the magnet 3 will hold the lever 5 in the position shown in Fig. 1. Should, however, the controlling circuit be opened in any manner to deënergize the magnet 3, the air in the casing 12 (which is under pressure) will force the valve stem 11 upwardly, thus lifting the lever 5 and the slides 21 and 26 to open the ports 19 and 20, thereby disturbing the equilibrium of the air in the train pipe and permitting the air brakes to be set in the usual manner. Reënergization of the magnet 3 by the closing of the controlling circuit, restores the parts to their normal position shown in Figs. 1 and 3. While I have shown a spring for assisting the magnet 3 to hold the valve mechanism closed, such spring may be omitted if desired.

From the foregoing description, taken in connection with the accompanying drawings, it is thought the complete construction, operation and advantages of my invention will be readily understood by those skilled in the art to which the invention appertains, and I desire to say that slight changes in the details of construction, combination and arrangement of parts may be made without departing from the spirit of the invention or the scope of the appended claims.

What I claim is:

1. An air operated electrically controlled valve mechanism comprising a valve casing having an outlet port, a slide valve controlling said port, means for establishing a fluid pressure within the casing and electromagnetic lever devices for holding said valve against said fluid pressure.

2. A valve casing having an outlet port and a slideway, a slide valve for closing said port, said valve having a stem, a lever operatively engaging said stem, an armature for said lever, an electromagnet coöperating therewith to hold said valve to close said port, and means for admitting fluid under pressure into said casing.

3. An air operated electrically controlled valve mechanism, comprising a valve having an outlet port, a slide valve controlling said port, means for establishing a fluid pressure within the casing and electromagnet lever devices for holding said valve against said fluid pressure, and means for assisting said electromagnet in holding said valve against said pressure.

4. A valve casing having an outlet port and a slide way, a slide valve for closing said port, said valve having a stem, a lever operatively engaging said stem, an armature for said lever, an electromagnet coöperating therewith to hold said valve to close said port, and means for admitting fluid under pressure into said casing, and means for assisting said electromagnet in holding said valve shut.

5. A valve casing having outlet ports, slide valves for closing such ports, said slide valves having telescopic projections, and a stem common to both valves to cause them to operate in unison, and an electromagnetically controlled lever mechanism engaging said stem to hold said valves in one position.

6. A valve casing having outlet ports, slide valves for closing such ports, said slide valves having telescopic projections, and a stem common to both valves to cause them to operate in unison, an electromagnetically controlled lever mechanism engaging said stem to hold said valves in one position, and an auxiliary means to assist the said lever mechanism to perform its valve holding functions.

7. A valve casing having outlet ports, slide valves for controlling such outlet ports, said slide valves having telescopic projections and a stem common to said valves to cause them to move in unison and means for admitting fluid into said casing.

8. A valve mechanism comprising a casing having an inlet port and an outlet port, and a slide way adjacent to said outlet port a slide valve operating in said slide way to control said port, and electromagnetically controlled lever devices connected with said valve.

9. A valve mechanism comprising a casing having an outlet port, and an inlet port, a slide valve controlling communication between said ports, and electromagnetically operated lever devices operatively connected with said valve.

JEAN F. WEBB, Jr.

Witnesses:
CHARLES M. KENNEDY,
LORENZO E. TRIPLER.